Oct. 29, 1946.　　　　A. F. HICKMAN　　　　2,410,068
SPRING SUSPENSION FOR RAILROAD CARS
Filed Feb. 24, 1943　　　　5 Sheets-Sheet 1

INVENTOR
Albert F. Hickman
BY
Popp and Popp
ATTORNEYS

Oct. 29, 1946.  A. F. HICKMAN  2,410,068
SPRING SUSPENSION FOR RAILROAD CARS
Filed Feb. 24, 1943  5 Sheets-Sheet 3

INVENTOR
Albert F. Hickman
BY
Popp and Popp
ATTORNEYS

Patented Oct. 29, 1946

2,410,068

UNITED STATES PATENT OFFICE 2,410,068

SPRING SUSPENSION FOR RAILROAD CARS

Albert F. Hickman, Eden, N. Y., assignor to Hickman Pneumatic Seat Co. Inc., Eden, N. Y., a corporation of New York Application February 24, 1943, Serial No. 476,943

7 Claims. (Cl. 105—197)

This invention relates to a spring suspension for railroad cars and is more particularly shown as embodied in a truck of a freight car, although features of the invention are equally applicable to passenger car spring suspensions as more particularly set forth in my copending application Ser. No. 473,824, filed January 28, 1943.

One of the principal objects of the invention is to provide a spring suspension which will function to safely support the car body at high speeds, higher speeds being demanded of both passenger and freight trains.

Another object of the invention is to provide such a suspension in which torsion rods are used in place of the usual bolster springs and in such manner as to provide a longer and a variable spring resistance range within the limited space available in a conventional freight car truck.

Another object of the invention is to provide a spring suspension which provides for the lateral cushioning of the car body as well as its vertical cushioning thereby to absorb lateral impacts imposed upon the car body as well as vertical impacts.

Another object is to provide a railroad truck having such a spring suspension in which all parts are well within the limits of size and movement required by present railroad standards.

Another object of the invention is to provide such a spring suspension which has the necessary features of safety both against breakage and also to insure the car being solidly supported on the tracks at all rail speeds.

Another object of the invention is to provide such a spring suspension which provides the necessary stability and also provides the desired riding qualities.

Another object is to provide a truck and spring suspension for railroad cars which is light in weight and is also adapted to be used in conjunction with lightweight bodies and equipment, such lightweight bodies and equipment being desired with the use of increased rail speeds.

Another object of the invention is to provide such a spring suspension having many operating economies, such as the saving in fuel; the saving in wear on the tracks and the wheels; and the saving in maintenance of the car bodies, trucks and spring suspensions.

Another object of the invention is to provide such a suspension in which the friction of the spring suspension can be reduced to any desired degree, and therefore the stress upon the springs is held low enough to insure long life and freedom from the danger of breakage.

Another object is to provide such a suspension having self-lubricating bearings so as to eliminate the necessity for attention to these bearings.

Another object is to provide a truck frame which is semi-rigid in construction, the rigidity being provided in the direction to permit the use of wide effective spring centers to improve stability and side sway control, and the flexibility being provided in the direction to accommodate all wheel and axle compensation requirements.

Another object is to produce the above flexibility in the truck frame by simple flexible cross members between the truck side frames which impart rigidity to the truck frame in all directions other than that desired to secure wheel and axle compensation.

Another object is to provide a spring suspension in which any desired frequency or degree of spring deflection can be obtained.

Another object is to provide such a suspension in which all parts are adequately protected or housed, thereby to protect them against injury due to weather conditions or the impact from flying stones and the like.

A further object of the invention is to provide such a suspension which is extremely compact, the suspension in particular employing the bolster to house certain of the torsion rods.

Other objects and advantages will be readily apparent from the following description and accompanying drawings, wherein:

The invention is shown as embodied in a four wheeled truck particularly designed for supporting a freight car body indicated generally at 19, although it will be understood that features of the invention can be employed in conjunction with six wheel trucks and can be employed in trucks designed for passenger car service, particularly the means shown whereby lateral cushioning of the truck frame is achieved through the use of ring springs between the journal boxes for the axles and the pedestal legs of the truck side frames.

The flanged railroad wheels 20 are shown as riding on the rails 21 of the track and as being fast to axles 22 of standard construction. The ends of the axles project beyond the wheels 20 and are journaled in journal boxes 23 of any usual and well known construction, a feature of the invention residing in the provision of pivot lugs or bosses 24 projecting forwardly and rearwardly from the front and rear walls, respectively, of the journal boxes and which connect, through ring springs, as hereinafter described, with the pedestal legs of the truck side frames to provide lateral and vertical cushioning of the impact between the axles and the trucks. These truck side frames, indicated generally at 25, are shown as made of a single steel casting, although it will be understood that they could be of fabricated construction and each is formed to provide an upper bar 26, a lower bar 27 and bolster guide columns 28 which form a top bolster opening 29 and a lower bolster opening 30, the lower bolster opening being shown as wider than the upper bolster opening.

Figures 3, 4:
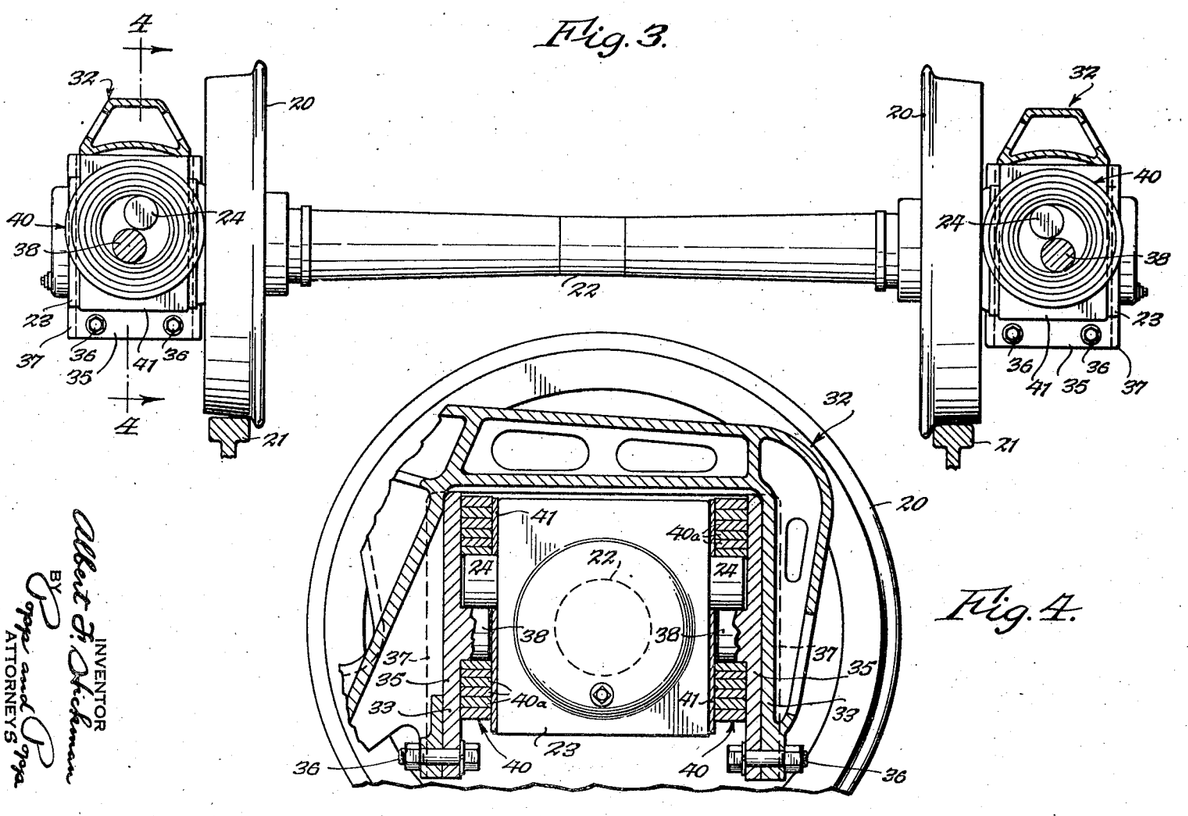
Fig. 3 is a vertical transverse section, taken on line 3—3, Fig. 2.
Fig. 4 is a fragmentary enlarged vertical section, taken on line 4—4, Fig. 3.

Each of the truck side frames 25 is formed at its ends to provide a pedestal 32 having a pair of pedestal legs 33 which form a pedestal jaw in which the corresponding journal box 23 is arranged. As best shown in Figs. 1-4 a plate 35 is secured by a pair of bolts 36 to the inner face of each of these pedestal legs 33, these plates being held against lateral displacement by side flanges 37 which embrace the pedestal legs and the bolts 36 preventing the plates from sliding downwardly but permitting them to be removed. These plates are formed to provide opposed pivot bosses or lugs 38 which are preferably about the same size as the pivot bosses 24 and arranged under and immediately adjacent thereto. As best shown in Fig. 3, in the normal loaded condition of the freight car the axis of the pedestal pivots 38 is arranged in a vertical plane disposed outside of the vertical plane intersecting the axis of the corresponding journal box pivots 24. By this arrangement the line or plane of pressure between these pivots extends upwardly and inwardly from the pedestal pivots 38 to the axle or journal box pivots 24.

For this purpose each companion pair of these pedestal and axle or journal box pivots 38 and 24 is connected by a shackle or ring spring assembly 40 composed of a plurality of nested endless springs 40a. Each of these groups 40 of springs is essentially a shackle connecting each axle or journal box pivot 24 with the corresponding pedestal pivot 38 and extending upwardly and inwardly from the pedestal pivot 38 to the axle pivot 24. However, while slanting rigid shackles having full bearing with these pivots could be provided, it is highly desirable they be in the form of springs to act as cushions against both vertical and lateral impacts between the axle and the truck frame and thereby reduce the unsprung weight of the car to the wheels, axles and journal boxes as well as to provide a yielding resistance to sledge hammer blows or violent impacts directly at the axle and eliminate the transmission of such violent impacts through the truck frame to the torsion rods which form the main springs of the suspension. Further for reasons of economy, it is desirable that these shackles be in the form of cylindrical bodies of spring steel which can readily be produced by cutting sections from spring steel tubing of progressively smaller diameter, heat treating the cut sections and nesting the sections together. These sections are shown as cut to fit the space between each plate 35 and a wear plate 41 which is fitted over the corresponding axle or journal box pivot 24 and against the face of the journal box so as to provide a readily replaceable wearing unit against which the ends of the ring springs 40 oscillate. The plates 35 against which the opposite ends of the ring springs oscillate are also, of course, readily replaceable should wear take place to an extent which would permit an excessive movement of the axles and their journal boxes lengthwise of the car body.

Such nested ring springs serve the requirements of supporting loads of practically any size on pivots, such as the pivots 24 and 38, which move relative to each other without rotation about their axes. This type of ring spring shackle accommodates variable loads and horizontal as well as vertical movement of the pivots and since the contact between the two pivots and the ring springs is inherently a rolling contact, there is no need for lubrication, this being a feature of the invention.

The desired amount of vertical deflection of the ring springs 40 is determined by the number of the rings, the circumferential size of the rings, and the thickness of the rings. The capacity of the ring springs within given stress limits is determined by the thickness and circumference of the rings, the number of rings and the width of the rings. Thus, the character of ring springs required for any particular condition can be very readily calculated.

Referring more particularly to Figs. 1, 2, 8 and 9, it will be noted that the truck side frames 25 are secured together by a plank indicated generally at 45. This plank is, however, composed of a plurality of sheet metal laminations 45a which are arranged horizontally one on top of the other, and each of which preferably has its opposite sides bent up, as indicated at 46, so that the plank is pan-shaped in cross section. The ends of this pan-shaped laminated plank 45 rest on the lower bars 27 of the two truck side frames within the lower bolster openings 30 and are held in position on the bars 27 by bolts 48 which extend through the ends of the laminated planks 45 and have heads 49 which fit into recesses 50 provided in the upper sides of the lower bars 27 of the truck side frame. These bolts 48 also serve to secure other parts, as hereinafter described, but their heads 49 fitting in the recesses 50 hold the truck side frames in spaced relation through the medium of the plank 45.

Further, since the plank is horizontally disposed and secured by the horizontally spaced snugly fitted bolt heads 49 to the truck side frames 25, the side frames are incapable of longitudinal movement relative to each other, the laminated plank preventing such motion. However, since the plank 45 is made of a series of laminations it is free to twist and hence permits either end of either truck side frame to rise without lifting the other corners of the truck. Since the plank 45 is still in a horizontal plane, it will also be appreciated that the plank holds the truck side frames 25 in a parallel horizontal plane, i. e. it serves to prevent the truck side frames from toeing in or toeing out at either end of the truck. The laminated plank 45 can be assisted in this capacity by the provision of cross bars 55 within the truck side frames which have universal connection with the truck side frames as hereinafter described.

Figure 1:
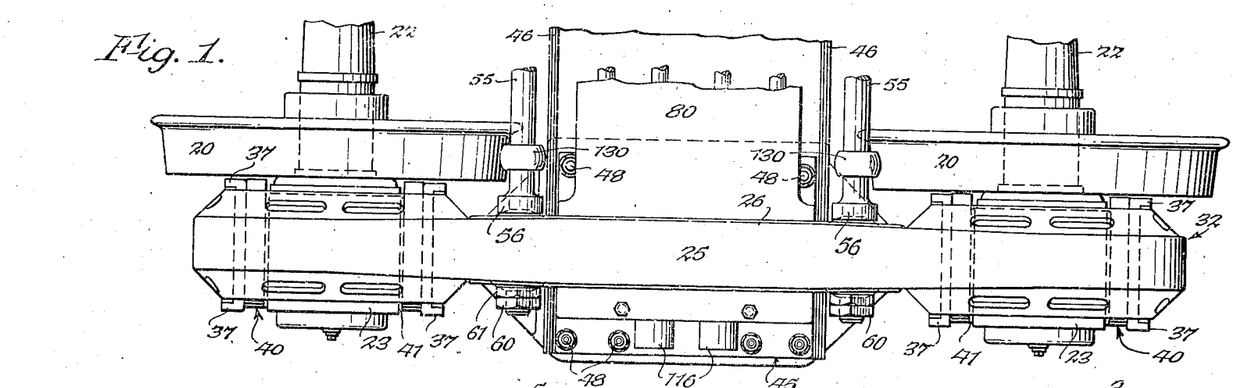
Fig. 1 is a fragmentary top plan view of a truck for a railroad car body embodying my invention.
Figure 2:
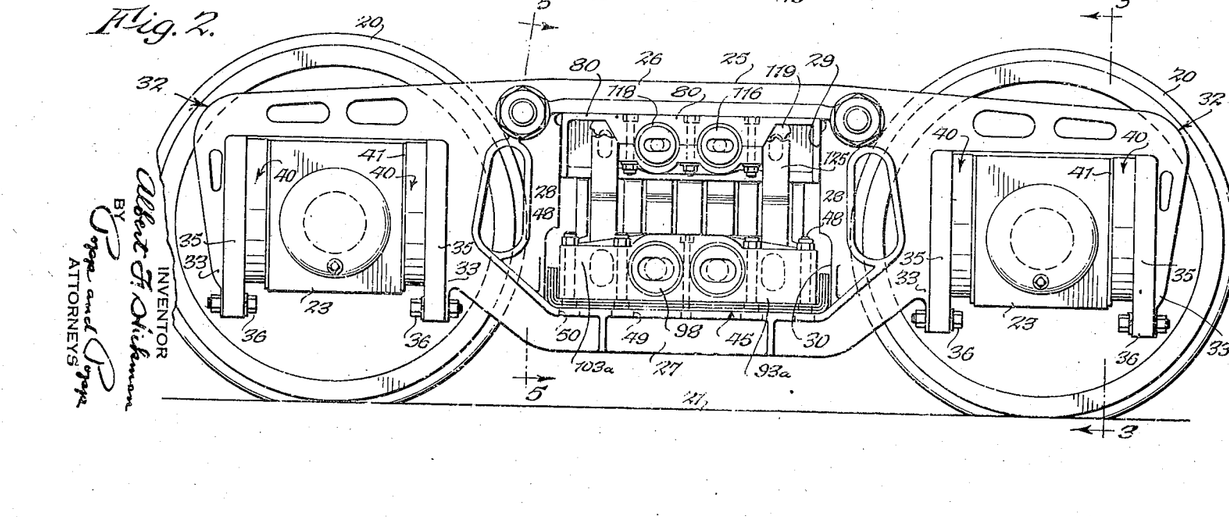
Fig. 2 is a side elevation thereof.
Figure 5:
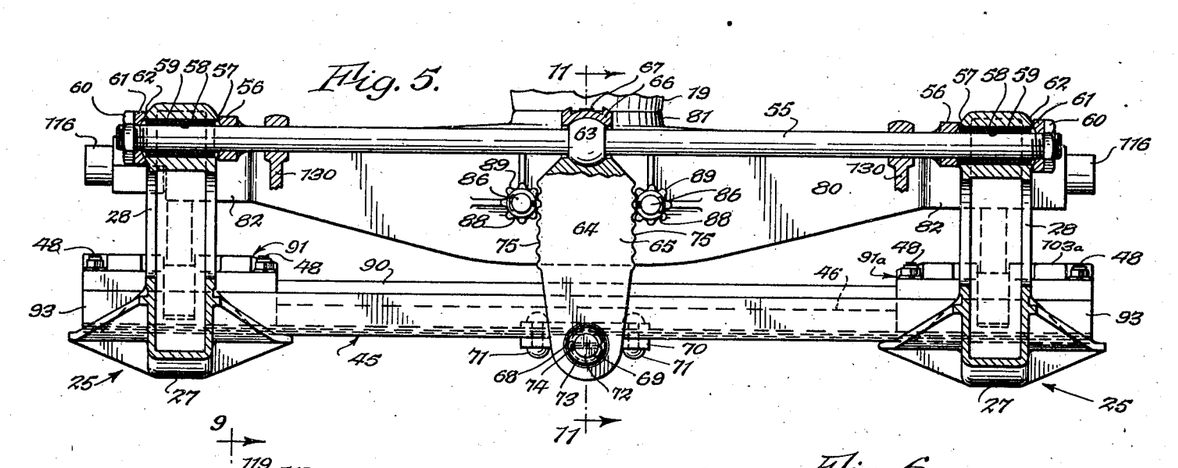
Fig. 5 is a fragmentary vertical transverse section, taken on line 5—5, Fig. 2.

As best shown in Figs. 1 and 5, these cross bars 55 are arranged on opposite sides of the laminated plank 45 and connect the upper parts of the truck side frames 25. Each of these cross bars 55 is shown as having a ring 56 welded to each of its ends, each of these rings 56 being provided with a concave spherical face engaging a convex spherical boss 57 provided on the adjacent side of each truck side frame and around a horizontal bore 58 through which the end of the cross rod 55 extends. A sleeve 59 of rubber or other soft, resilient, plastic material is fitted tightly in each bore 58 around the corresponding end of the cross bar 55 and the adjacent extremity of the rod is threaded to receive a nut 60 which holds a threaded washer 61 having a concave inner face against a convex boss 62 provided on the outer side of the truck side frame around the bore 58. It will be seen that the rubber sleeves 59, in combination with the convex bosses provided on opposite sides of the truck side frames around the bores 58 and engaging the concave faces of the corresponding ring 56 and washer 61 provides a universal connection between each end of each of the rods 58 and the truck side frame and at the same time insures that these rods positively hold the upper ends of the truck side frames 25 against both inward and outward displacement relative to each other.

Figure 11:
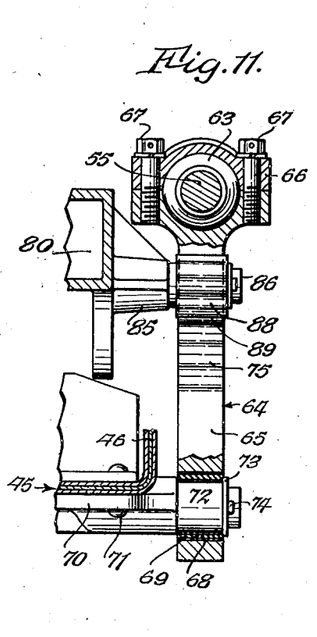
Fig. 11 is an enlarged vertical section, taken on line 11—11, Fig. 5.

Each of these rods 55 is also shown as formed at its center to provide a ball 63 which forms a universal mounting for a depending bolster centering plate 64. As best shown in Figs. 5 and 11, each of these bolster centering plates 64 is in the form of a flat plate 65 which is formed at its upper end to provide a spherical half socket which fits the underside of the corresponding ball 63 and is secured thereto by a cap 66 which fits around the upper side of the corresponding ball 63 and is secured to the bolster centering plate 64 by screws 67 or in any other suitable manner. These bolster centering plates hang from the rods 55 and are provided at their lower ends with bores 68, each of which contains a bushing 69 of rubber or other soft, resilient, plastic material. An attaching plate 70 is secured centrally to the underside of the laminated plank 45, as by rivets 71, and is formed at its opposite ends to provide reduced cylindrical extensions 72 which are tightly fitted within the rubber bushings 69. Each rubber bushing 69 is preferably held in a compressed condition by a washer 73 fitted over the end of the corresponding extension 72 and secured in place by cotter pins 74 or in any other suitable manner.

The primary purpose of the depending bolster guide plates 64 is to guide the bolster in its vertical movement. For this purpose each of the depending bolster guide plates 64 is provided along its opposite vertical edges with teeth 75 which are preferably, although not necessarily, of undulating form. In this function of guiding the bolster in its lateral movement and hence preventing lateral or endwise movement of the bolster, it will be seen that the bolster guide plates 64 are maintained in centered relation to the truck frame through the connections of each with the laminated plank 45 and the corresponding cross rod 55 and at the same time that these connections do not interfere with the flexibility of the truck frame in securing wheel compensation, that is, the bolster guide plates 64, through the universal connections with the cross rods 55 and laminated plank 45, do not interfere with the freedom of one end of either truck side frame 25 to rise without lifting the other corners of the truck frame.

The bolster 80 is shown as being of cast steel construction having the usual center plate 81 and having the usual flat bearing surfaces 82 which ride along the upper parts of the bolster guide columns 28. However, it will be noted that the bolster is unprovided at its ends with the usual centering lugs or shoulders which engage the bolster guide columns to prevent lateral or endwise movement of the bolster and hence guide it in its vertical movement. Instead, the flat bearing faces 82 are planar their entire extent and the guiding of the bolster 80 in its vertical movement is accomplished exclusively through the depending bolster guide plates 64.

For this purpose the bolster is formed on each side to provide a pair of bosses 85, each supporting a stub shaft 86, these stub shafts on each side of the bolster straddling the depending bolster guide plate 64. Each of these stub shafts carries a loose pinion 88 having teeth 89 of undulating form which mesh with the undulating teeth 75 of the corresponding depending bolster guide plate 64. Since the pinions 88 are loose upon the stub shafts 86, the bolster is free to move up and down. Since, however, these pinions 88 are provided in pairs to engage opposite sides of the depending bolster guide plates 64 and since these plates are held in centered relation to the truck frame, it will be seen that these pinions positively prevent endwise of lateral movement of the bolster and thereby eliminate the necessity for any shoulders or other guiding means provided at the ends of the bolster to engage the truck side frames 25 for the purpose of so centering the bolster.

Instead of the usual helical bolster springs to provide the spring suspension between the truck side frames 25 and the vertically movable bolster 80, the spring means is provided, in accordance with the present invention, by two sets of torsion rods. These torsion rods are arranged transversely of the truck, and one set is preferably lighter than the other set and the two sets interconnected in such manner that variable rate springing is obtained and a substantial spring deflection is obtained through the set of light torsion rods when the car body is empty. A further feature of the invention resides in the housing of one of the sets of torsion rods in the bolster 80 to protect the torsion rods and to render the suspension compact. The other set of torsion rods are arranged under the bolster 80 and are carried by the truck side frames 25 and are arranged over the laminated plank 45. The upper set of torsion rods housed within the bolster 80 are the light rods and the lower set of torsion rods arranged between the bolster and the laminated plank 45 are the heavy torsion rods.

Figure 8:
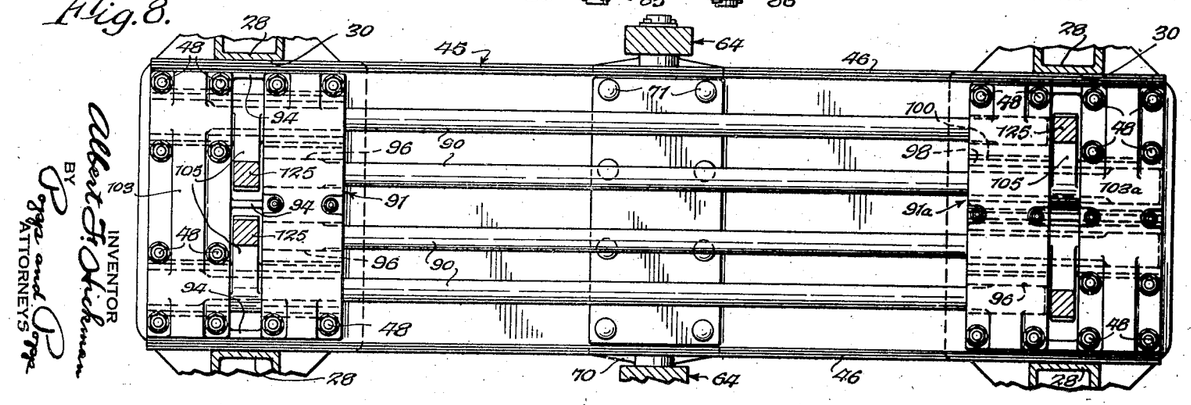
Fig. 8 is a fragmentary horizontal section, taken on line 8—8, Fig. 6.
Figures 9, 10:
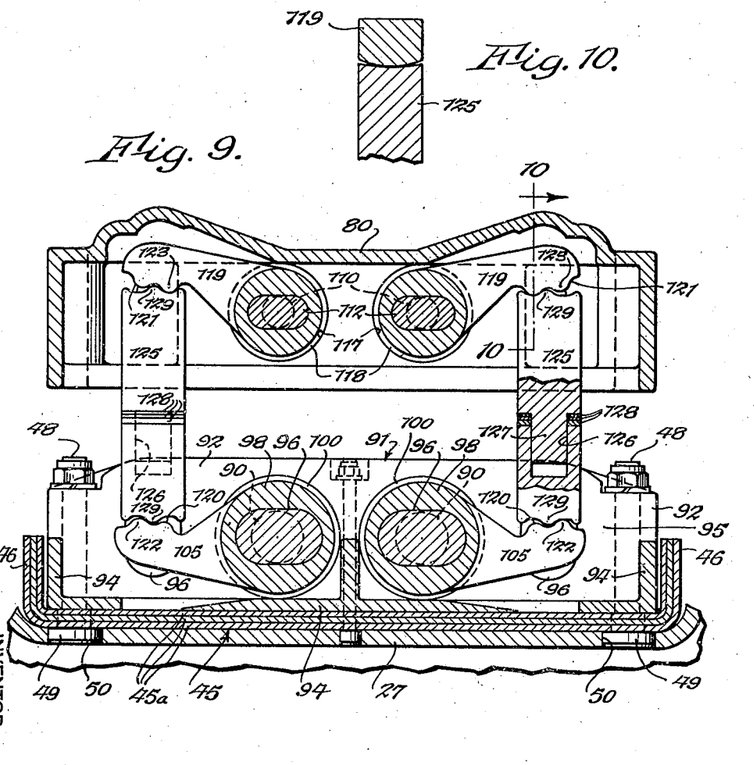
Fig. 9 is an enlarged vertical section, taken on line 9—9, Fig. 6.
Fig. 10 is a fragmentary vertical section, taken on line 10—10, Fig. 9.

As best shown in Figs. 5, 6, 8 and 9, the mounting for the lower torsion rods 90 at the left hand side of the truck frame, as viewed in these figures, comprises a block 91 having its base resting on the laminated plank 45 directly above the lower bar 27 of the corresponding truck side frame 25 and secured to the laminated plank by the bolts 48, these bolts extending through the block for this purpose. This block comprises an inner part 92 of sufficient height and breadth to provide bearings and anchorages for the torsion rods 90, which are four in number; an outer part 93 which is formed to provide half bearings for the torsion rods; and a web 94 connecting the inner and outer parts of the block and integral therewith. As best shown in Fig. 9, this web 94 is provided with upstanding flanges along its opposite sides and serves to space the inner and outer parts 92 and 93 from each other and provide a space 95 for levers or crank arms through which the rods are placed under torsion as hereinafter described. This web also serves as a stop to limit the downward movement of the lower torsion rod crank arms as hereinafter described.

Each end 96 of each of the torsion rods 90 is shown as enlarged and ovaled in the manner described in my Patent No. 2,213,004, granted Aug. 27, 1940, for Torsion rod mounting, and at the block 91, the center two of the four torsion rods 90 have their ends 96 fitted in an ovaled bore 97 of a tubular sleeve 98. Each of these sleeves is rotatably mounted in a bore 99 in the inner portion 92 of the block 91, a bearing bushing 100 being fitted in this bore. In line with each bore 99, the outer portion 93 of the block 91 is formed to provide a half bearing socket 101 into which is fitted the lower half of a bearing bushing 102 which rotatably receives the outer end of the corresponding sleeve 98. An upper half bearing cap 103 is bolted upon the outer portion 93 of the block 91 and is recessed on its underside to fit the upper halves of the two bearing bushings 102.

The ovaled ends 96 of the outer two rods 90 of the lower set are anchored in ovaled bores 104 formed in the inner portion 92 of the bearing block 91 so as to anchor these ends of these rods. It will therefore be seen that the ends of the inner pair of torsion rods 90 are rotatably mounted in the block 91 at the left hand side of the truck as viewed in Figs. 5, 6 and 8, thereby to provide a pair of torsion rods having live ends at this block, whereas the ends of the outer pair of torsion rods 90 are anchored in this block 91 thereby to render these ends of these rods dead or anchored.

Figure 6:
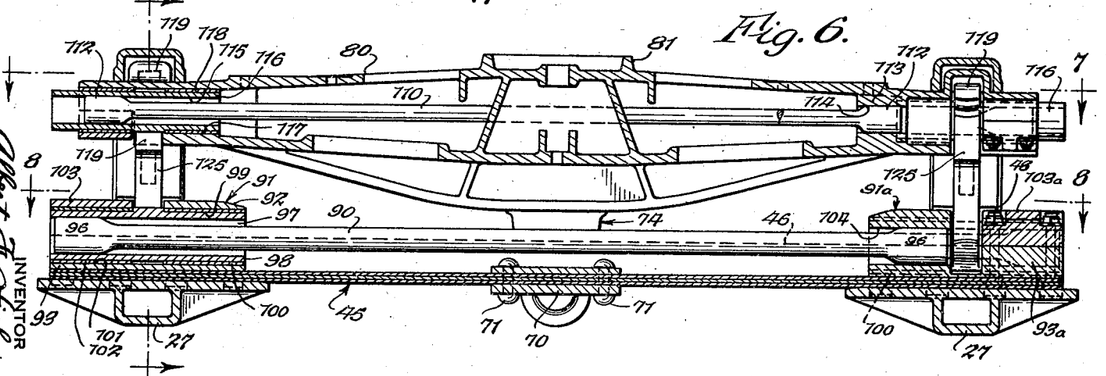
Fig. 6 is a fragmentary vertical transverse section, taken on line 6—6, Fig. 7.
Figure 7:
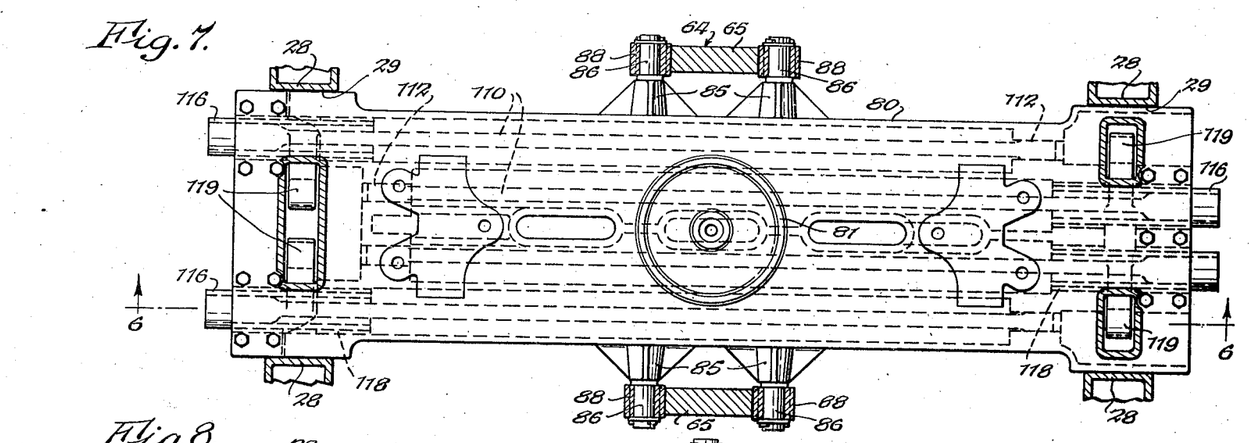
Fig. 7 is a fragmentary horizontal section, taken on line 7—7, Fig. 6.

The other ends of the torsion rods 90, that is, at the right hand side of the truck, as viewed in Figs. 5, 6 and 8, are mounted in a similar manner in a block 91a except that, of course, the ends of the center pair of torsion rods 90 at this side of the truck are the dead ends and hence anchored in the block and the corresponding ends of the outer pair of torsion rods 90 are the live ends of the rods and hence are rotatably mounted in the block. Since in other respects the block 91a at the right hand side of the truck is identical to the block 91 at the left hand side of the truck, the same reference numerals have been applied and distinguished by the suffix "a" and the same description is deemed to apply.

A lever or crank arm 105 is formed integrally with each of the sleeves 98. These levers are arranged in the space 95 between the inner and outer portions 92 and 93 of the corresponding block 91 and the bore 97 of the sleeve 98 of each lever is fitted over the ovaled live end of the corresponding torsion rod 90. The crank arms 105, in the normal position of the suspension, extend generally horizontally out from the live end of the torsion rod to which it is attached and at the left hand side of the truck, as viewed in Figs. 5, 6 and 8, these arms project in opposite directions from the live ends of the inner pair of torsion rods 90, whereas at the other side of the truck these arms project in opposed relation to each other from the live ends of the outer pair of torsion rods 90.

Directly above each of the rods 90 comprising the lower set of torsion rods is arranged a corresponding upper torsion rod 110, these upper torsion rods being lighter and being arranged parallel with the lower torsion rods and housed within the bolster 80. Each of these upper torsion rods 110 has each of its ends 112 ovaled in the same manner as with the torsion rods 90 and the live end of each of the upper torsion rods 110 is arranged directly above the live end of the rod 90 arranged thereunder. Similarly, the anchored end of each of the upper torsion rods 110 is arranged directly over the anchored or dead end of its companion rod 90 of the lower set of torsion rods.

To so house and mount the torsion rods 110, the bolster 80 is of box form and at the dead end of each of the torsion rods 110 is internally formed to provide a vertical post 113 having an ovaled bore 114 in which the ovaled dead end of the corresponding torsion rod 110 is fitted. The ovaled live end of each torsion rod 110 is shown as fitted in the ovaled bore 115 of a sleeve 116, this sleeve being journaled at its opposite ends in a bore 117 in the corresponding end of the bolster 80 through the medium of a pair of bearing bushings 118. A lever or crank arm 119 is formed integrally with each sleeve and projects generally horizontally outward therefrom, as best shown in Fig. 9, and in the same direction as the companion lever arm 105 arranged directly thereunder. The bolster is shown as offset upwardly above the free end of each of the crank arms so as to provide a stop to limit the upward movement of each of the lever or crank arms 119 and thereby prevent overloading of any of the torsion rods 110.

The opposing sides of the lever arms 105 and 119 are formed at the extremities of the levers to provide cam faces 120, 121, the cam face 120 of each lower lever arm 105 facing upwardly and the cam face 121 of each upper lever arm 119 facing downwardly. To prevent slippage of these cam faces on the surfaces on which they ride, these cam faces are preferably formed to provide a series of uniformly spaced wavy teeth 122, 123 which extend parallel with the axes of the lever arms, the effective cam faces of the lever arms thereby being the pitch line of these teeth.

The companion pairs of lower and upper lever arms 105, 119 are interconnected by a compression bar 125. This compression bar is rectangular in cross section and is also preferably adjustable as to length so as to permit of varying the relative spacing of each companion pair of lever arms 105, 119 in operation. For this purpose the compression bar is shown as made of two sections, the lower section being provided with an axial bore 126 at its upper end, as best shown in Fig. 9, and receiving a stem 127 provided on the upper section. A series of shims or washers 128 surrounding the stem 127 and interposed between the two sections of the compression bar 125 determines the effective length of the compression bar.

The opposite ends of the compression bar 125 are formed to provide wavy teeth 129 which mesh with the teeth 122 and 123 of the lever arms 105 and 119, respectively. The pitch lines of these teeth 129 are parallel with each other. The sole purpose of the wavy teeth 129 and the wavy teeth 122 and 123 intermeshing therewith is to prevent the parts from slipping out of proper relation to one another and in their essential operation the compression bars 125 may therefore be regarded as having planar, parallel, end faces engaging true cam faces on the opposing faces of the lever arms 105 and 119.

The cam faces 121 (or the pitch lines of the teeth 123) reduce the force imposed on the light torsion rods 110 and increase the force imposed upon the heavy torsion rods 90 as the total force imposed upon the suspension increases. By this means under light impacts or load conditions, the preponderance of the work is done by the relatively light torsion rods which provide the flexibility desired for these conditions. Conversely, the preponderance of the heavy impacts or loads is transferred to the relatively heavy torsion rods 90. To this end the cam faces 121 are arranged so that as the lever arms 119 move under increasing load, the line of engagement between each of these lever arms and the upper end of the corresponding compression bar 125 is moved toward the relatively light torsion rod 110 with which the lever arm connects. This movement of the lines of engagement thereby decreases the effective length of the lever arms 119. Accordingly, as the load increases the leverage of these lever arms 119 is adjusted to favor the light torsion rods 110 so that the preponderance of the load is borne by the heavy torsion rods 90.

It will also be noted from an inspection of Fig. 10 that the engaging wavy teeth 122 and 123 of each lever arm and its compression bar 125 are cut so as to have a transverse curvature, this transverse curvature of the wavy teeth of the lever arms being greater than the transverse curvature of the compression bar. As a result each compression bar 125 is urged into centered relation with the lever arms and are held in this centered relation so that the compression bars do not slip sidewise to engage and wear adjacent stationary parts or to slip out completely. This transverse curvature of the wavy teeth thereby constitutes a simple means for holding these parts in operative relation.

The cross rods 55 can be employed to support clasp brakes, these rods being shown as carrying brake hangers 130 for this purpose, as best shown in Figs. 1 and 5.

In its broadest aspect the truck operates in the same manner as a conventional rigid bolster truck, that is, the load of the car body on the center plate 81 is transmitted through the bolster and torsion rods to the truck side frames 25 of the truck. From the truck side frames the load is transmitted through the journal boxes 23 to the axles 22 and wheels 20. The greater part of the vertical impacts are absorbed by the torsion rods, the bolsters being free to move vertically in the bolster openings for this purpose.

In accordance with the invention, however, the axles are each permitted to move laterally of the truck frame by virtue of the shackle or ring spring assemblies 40 which connect the journal boxes 23 with the pedestal legs 33.

While the ring springs 40, through their lateral and vertical resiliency, reduce the unsprung portion of the truck to the axles, journal boxes and wheels, it is not desirable to make these ring springs flexible enough to provide sufficient vertical wheel and axle movement as to permit the use of an entirely rigid truck frame. However, the lateral cushioning and vertical cushioning provided by these ring springs 40 permits of obtaining axle compensation through truck frame flexibility. By connecting the truck side frames 25 through the laminated plank 45 and through the universally connected cross rods 55, the desired flexibility of the truck frame to secure axle compensation is achieved and at the same time the truck side frames are positively held in register with each other and prevented from toeing in or out at the opposite ends of the truck. Thus, the laminated form of the plank 45 permits its twisting so that one corner of the truck frame can rise or fall without lifting or depressing the other corners of the truck frame. It will be seen that this axle compensation through the provision of flexibility of the truck frame is provided in a very simple and direct manner with extremely lightweight construction.

With the bolster springs in the form of torsion rods mounted as above described, the action of these torsion rods in resiliently supporting the bolster 80 on the truck side frames 25 is as follows:

The bolster 80 is free to move up and down in the bolster openings 29 of the two truck side frames 25. It is guided in this movement to follow a vertical path by its two pairs of pinions 88 which engage the teeth 75 provided on opposite sides of the bolster guide plates 64, these plates being held in centered relation to the truck frame through their universal connections with the laminated plank 45 and cross rods 55.

The bolster is supported on the truck by the two sets of torsion rods 90 and 110. Each torsion rod 90 of the lower set is anchored in one truck side frame 25 and has its opposite live end journaled in the opposite truck side frame 25. At this live end, each torsion rod 90 is provided with a horizontal lever arm 105.

Each torsion rod 110 of the upper seat is anchored at one end in one end of the bolster 80 and has its opposite live end journaled in the opposite end of the bolster. The lever arm 119 at the live end of each torsion rod 110 is connected to its companion lever arm 105 of a lower torsion rod 90 by the adjustable compression bar 125, the torsion rods 110 being relatively light and the torsion rods 90 being relatively heavy. The engaging end of each lever arm 119 with its compression bar 125 is formed to provide a cam face 121 so that as the lever arm 119 is moved upwardly under an increasing load the line of engagement between its cam face 121 and its compression bar 125 moves toward the corresponding relatively light torsion rod 110. By this means with an increasing load the effective length of the lever arms 119 is adjusted in favor of the lighter torsion rods 110 so that an increasing proportion of the load is borne by the heavy torsion rods 90.

It will be seen that the upward movement of the truck frame relative to the bolster 80 will effect an upward movement of the crank arms 119 of the upper set of torsion rods 110 and a downward movement of the crank arms 105 of the lower set of torsion rods 90. This movement is, of course, resisted by the torsion rods to provide the bolster spring means.

In the conventional freight truck the vertical space allowed for the usual helical bolster springs is very limited. Also the variation of the load on the springs is very high, being as much as 300 to 400%. Because of this, when coil springs are used they must be strong enough to carry the entire freight car body with its load with approximately 1¾ to 1⅞ inches of static spring deflection and with approximately another inch available for riding or dynamic spring deflection when the car is loaded. The spring rate necessarily has to be very high in order to support the load in so short a spring deflection range. Because of this high spring rate the static empty freight car only deflects the bolster springs from ¼ to ½ inch depending upon the weight of the empty body.

Because of this high spring rate and small amount of deflection, a tremendously high frequency results. It becomes very apparent when traveling at high speed, the empty car body being thrown upward to an extent that the car body weight at intervals is up off the trucks and therefore produces no downward pressure on the springs, axles and wheels. This condition is very dangerous at high speeds, because it allows the car wheels to freely jump off the rails.

With the torsion rod structure forming the subject of the present invention, there is developed a longer and a variable rate spring resistance range within the limited space available in a conventional freight car truck. This variable rate springing is obtained through the lever arms 105 and 119, which, when horizontal, have a maximum effective length, but decrease in effective length, so as to render the torsion rods more effective, as they are progressively rotated away from the normal horizontal position.

Further, in addition to providing a longer spring range and a variable rate suspension, the torsion rod assembly produces just enough friction within itself to eliminate the need for shock absorbers of any kind and still produce a satisfactory and stable ride. While each torsion rod necessarily has its live end journaled in a bearing, this bearing can be of the type that is self-lubricating. This is possible because the maximum load can be held to 250 pounds per square inch of bearing area. The structure is well adapted to the use of ample size bearings to produce the right amount of friction with self-lubricated bearings. This friction of these bearings is sufficient to control or sufficiently check the body frequencies caused by irregular tracks when the cars are loaded or empty. The heavier the load, the greater the amount of friction that will be produced.

It will be noted that the torsion rod assembly includes two sets of torsion rods. The rods of the upper set are of smaller diameter than the lower ones. The rods of the upper set are designed to deflect approximately 2½ inches with the static empty car load, while the rods of the lower set will only deflect approximately ⅜ of an inch. This allows a total of approximately 2⅞ inches of static spring deflection with an empty car. This total deflection with the empty car compares with the ¼ to ⅜ inch of spring deflection obtained in conventional trucks and this lends to greater stability at high speeds. It will be appreciated that by arranging the torsion rods 90 and 110 in series with each other and varying the relative size of the two sets of torsion rods any static and dynamic spring deflection can be obtained to secure optimum ride conditions.

With the present suspension, when the car body begins to oscillate up and down, the sprung weight will still be delivering a downward pressure on the trucks and wheels even when the car body moves upward an inch or even two inches. As previously pointed out, with a conventional freight car truck, there is only ¼ to ⅜ inch of static spring deflection available for the empty car and consequently if the body is thrown upward more than the ¼ to ⅜ inch there is no more downward pressure from the car body to stabilize the truck.

While not limiting the scope of the present invention, it is proposed to provide a total spring suspension of approximately 5¾ inches. In order to insure the maintenance of the parts in the proper relation, a preloading of about ¾ of an inch on the springs is suggested. That is, the lighter springs will be partly compressed in assembling them into the bolster and when positioned these torsion rods will be released to hold themselves in place by their own pressure. With a total of 5¾ inches of spring deflection and ¾ of an inch used for preloading, 5 inches is available for the useful load, and it is proposed to support the bolster, in the static empty car position about 2½ inches above its bottom position. The maximum loaded position of the bolster should be from 1 to 1¼ inches above the bottom.

From the foregoing, it will be seen that the present invention provides a variable rate long spring range torsion rod spring suspension within the limits set by present day railroad freight car truck design which also has the inherent friction to render shock absorbers unnecessary. It will also be seen that the present invention provides lateral cushioning between the axles and the journal boxes in a simple and direct manner and also provides yielding resilience between the journal boxes and pedestal legs so as to reduce the unsprung weight of the suspension to a minimum and also so as to permit the use of a flexible truck through the flexibility of which axle compensation is obtained. The suspension embodying the invention is particularly desirable at high speeds in securing the proper ride characteristics and at the same time obtain the necessary stability. It will further be seen that the present invention provides a compact suspension which is light in weight and which will function to provide these improved ride characteristics with little attention or danger of breakdown.

I claim as my invention:

1. In a railroad truck, a wheeled axle, a truck frame supported on said wheeled axle, a bolster mounted on said truck frame for vertical movement relative thereto, a torsion rod arranged parallel with said bolster and having one end anchored in one side of said truck frame and having its other end journaled in the other side of said truck frame, a second torsion rod arranged parallel with said first torsion rod and having one end anchored in said other side of said truck frame and its other end journaled in said one side of said truck frame, a third torsion rod having one end anchored in one end of said bolster and having its other end journaled in the other end of said bolster, a fourth torsion rod having one end anchored in said other end of said bolster and its other end journaled in said one end of said bolster, a crank arm fixed to the journaled end of each of said torsion rods and normally projecting horizontally outward therefrom, and a compression member interposed between each crank arm of said torsion rods mounted on said truck frame and the adjacent crank arm of the corresponding torsion rod mounted on said bolster to yieldingly resist downward movement of said bolster relative to said truck frame, one of the engaging faces between each compression member and each crank arm being cam-shaped to shift said compression member to rotate about a predetermined axis in transmitting pressure thereby to vary the effective length of the two crank arms connected by said compression member and said engaging faces being also formed to provide interengaging wavy teeth to prevent slipping of said compression member in so shifting.

2. In a railroad truck, a wheeled axle, a truck frame supported on said wheeled axle, a bolster mounted on said truck frame for vertical movement relative thereto, a torsion rod arranged parallel with said bolster and having one end anchored in one side of said truck frame and having its other end journaled in the other side of said truck frame, a second torsion rod arranged parallel with said first torsion rod and having one end anchored in said other side of said truck frame and its other end journaled in said one side of said truck frame, a third torsion rod having one end anchored in one end of said bolster and having its other end journaled in the other end of said bolster, a fourth torsion rod having one end anchored in said other end of said bolster and its other end journaled in said one end of said bolster, a crank arm fixed to the journaled end of each of said torsion rods and normally projecting horizontally outward therefrom, and a compression member interposed between each crank arm of said torsion rods mounted on said truck frame and the adjacent crank arm of the corresponding torsion rod mounted on said bolster to yieldingly resist downward movement of said bolster relative to said truck frame, one of the engaging faces between each compression member and each crank arm being cam-shaped to shift said compression member to rotate about a predetermined axis in transmitting pressure thereby to vary the effective length of the two crank arms connected by said compression member, and said engaging faces being also curved transversely of the curvature of the cam face to maintain said compression member in centered relation to its crank arms transversely thereof.

3. In a railroad truck, a wheeled axle, a pair of truck side frames supported on said wheeled axle, a bolster guided at its ends in said truck side frames and for vertical movement relative thereto, a horizontal cross member connecting said truck side frames and arranged along one side said bolster, and means for preventing endwise displacement of said bolster relative to said truck side frames, comprising a bolster guide plate secured to the center of said cross member at the said one side of said bolster and having vertical sides opposing said truck side frames, and a pair of rollers on said bolster and each projecting laterally outward therefrom to engage one of said vertical sides of said bolster guide plate.

4. In a railroad truck, a pair of wheeled axles, a pair of truck side frames, means mounting each end of each of said truck side frames on one end of a corresponding wheeled axle and permitting a limited movement of said axle laterally of said truck side frames, a bolster guided at its ends in said truck side frames for vertical movement relative thereto, a laminated plank arranged under said bolster and connecting said truck side frames, said plank being capable of twisting to permit one end of said truck side frames to rise without lifting the other ends thereof, a cross member arranged on each side of said bolster and arranged parallel therewith, means providing a universal connection between each end of each of said cross members and the corresponding truck side frame, and means for preventing endwise displacement of said bolster relative to said truck side frames, comprising a bolster guide plate on each side of said bolster and connected at its lower end to the center of said laminated plank and at its upper end to the center of the corresponding cross member, said bolster guide plates having vertical sides opposing said truck side frames, and two pairs of rollers on said bolster and each roller engaging one of said vertical sides of said bolster guide plates.

5. In a spring suspension between a body supporting member and a wheel supported member of a railroad vehicle, a relatively light torsion rod journaled at one end on one of said members and anchored at its other end thereon, a relatively heavy torsion rod journaled at one end on the other of said members and anchored at its other end thereon, an arm fast to the journaled end of each of said torsion rods and projecting outwardly therefrom, and connecting means between the ends of said arms and interconnecting the same, said connecting means having an external face engaging an external face of the arm connected with said relatively light torsion rod, one of said engaging faces being cam shaped to shift, under increasing load, the line of engagement between said external engaging faces toward said light torsion rod to impose an increased proportion of the load on said heavy torsion rod.

6. In a spring suspension between a body supporting member and a wheel supported member of a railroad vehicle, a relatively light generally horizontal torsion rod journaled on one of said members and anchored at its other end thereon, a relatively heavy torsion rod arranged generally parallel with said light torsion rod and journaled at one end on the other of said members and anchored at its other end thereon, an arm fast to the journaled end of each of said torsion rods and projecting generally horizontally therefrom adjacent each other, and a compression member interposed between the free ends of said arms, said compression member having an external face engaging an external face of the arm connected with said relatively light torsion rod, one of said engaging faces being cam shaped to shift, under increasing load, the line of engagement between said engaging faces toward said light torsion rod to impose an increased proportion of the load on said heavy torsion rod.

7. In a spring suspension between a body supporting member and a wheel supported member of a railroad vehicle, a relatively light generally horizontal torsion rod journaled at one end on one of said members and anchored at its other end thereon, a relatively heavy torsion rod journaled at one end on the other of said members and anchored at its other end thereon, an arm fast to the journaled end of each of said torsion rods and projecting generally horizontally therefrom adjacent each other, and a compression member interposed between the free ends of said arms, said compression member having an external face engaging an external face of the arm connected with said relatively light torsion rod, one of said engaging faces being cam shaped to shift, under increasing load, the line of engagement between said engaging faces toward said light torsion rod to impose an increased proportion of the load on said heavy torsion rod and said engaging faces being also curved transversely of the curvature of the cam faces to maintain said compression member in centered relation to the arm of said relatively light torsion rod transversely thereof.

ALBERT F. HICKMAN.